US 10,063,770 B2

(12) United States Patent
Kinoshita

(10) Patent No.: US 10,063,770 B2
(45) Date of Patent: Aug. 28, 2018

(54) COMMUNICATION APPARATUS AND METHOD OF CONTROLLING SAME

(71) Applicant: CANON KABUSHIKI KAISHA, Tokyo (JP)

(72) Inventor: Yuichi Kinoshita, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/332,322

(22) Filed: Oct. 24, 2016

(65) Prior Publication Data
US 2017/0126960 A1 May 4, 2017

(30) Foreign Application Priority Data
Oct. 30, 2015 (JP) ................................ 2015-214803

(51) Int. Cl.
*H04N 5/225* (2006.01)
*H04N 5/232* (2006.01)
*H04N 5/44* (2011.01)

(52) U.S. Cl.
CPC ....... *H04N 5/23216* (2013.01); *H04N 5/2251* (2013.01); *H04N 5/23203* (2013.01); *H04N 5/23209* (2013.01); *H04N 5/44* (2013.01)

(58) Field of Classification Search
CPC ..... H04N 5/23216; H04N 5/44; H04N 5/2251

USPC ................................ 348/207.1, 207.11, 552
See application file for complete search history.

(56) References Cited

U.S. PATENT DOCUMENTS

2004/0225780 A1* 11/2004 Hori ........................ H04L 43/50
710/200
2013/0222627 A1* 8/2013 Earnshaw .......... H04N 5/23203
348/211.2

FOREIGN PATENT DOCUMENTS

JP 2006-339755 A 12/2006

* cited by examiner

*Primary Examiner* — Yogesh Aggarwal
(74) *Attorney, Agent, or Firm* — Carter, Deluca Farrell & Schmidt, LLP

(57) ABSTRACT

A communication apparatus comprises an image capturing unit, a controller, a first communication interface configured to communicate with an image capturing device which is attachable to the communication apparatus and a predetermined operation unit. The controller, in a first state for performing image capturing by the image capturing unit, causes the predetermined operation unit to function as a member for instructing image capturing by the image capturing unit, and, in a second state for causing the image capturing device to perform image capturing via the first communication interface, causes the predetermined operation unit to function as a member for transmitting a capturing instruction via the first communication interface to the image capturing device.

14 Claims, 8 Drawing Sheets

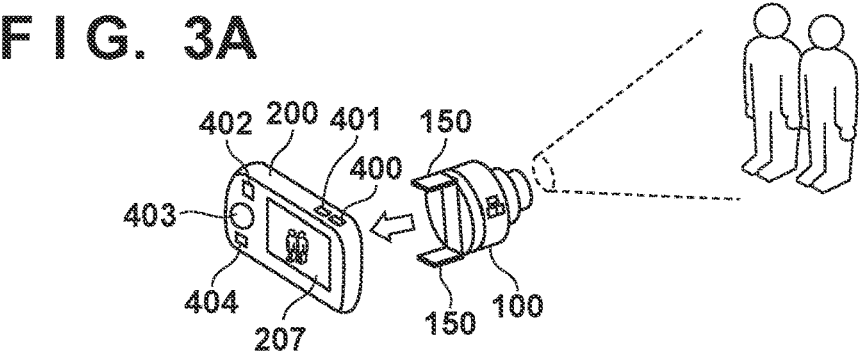
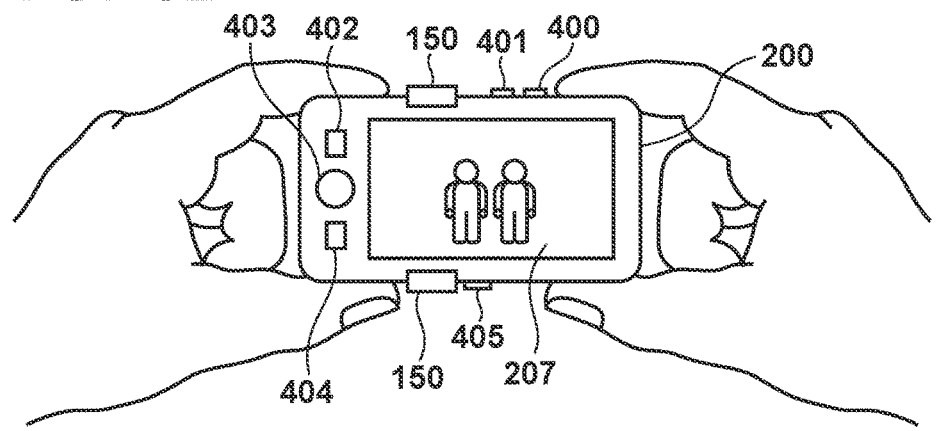
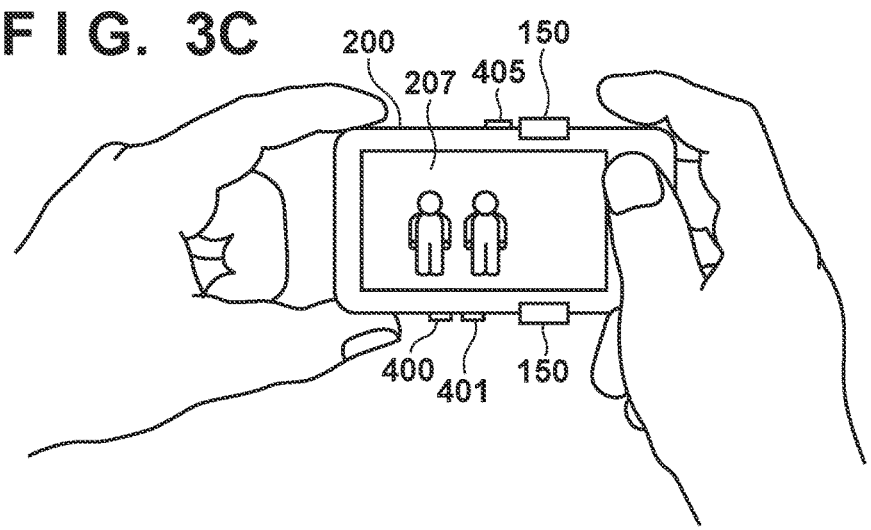

F I G. 6A

| MODEL NAME | SHOOTING | ZOOM | IMAGE CONFIRMATION |
|---|---|---|---|
| A PHONE | VOLUME INCREASE BUTTON | VOLUME DECREASE BUTTON | HOME BUTTON |
| B PHONE | VOLUME DECREASE BUTTON | VOLUME INCREASE BUTTON | BACK BUTTON |
| C PHONE | VOLUME INCREASE BUTTON | VOLUME DECREASE BUTTON | MENU BUTTON |

F I G. 6B

| MODEL NAME | HOLDING HAND | SHOOTING | ZOOM | IMAGE CONFIRMATION |
|---|---|---|---|---|
| A PHONE | LEFT SIDE SURFACE IS TOP SIDE/VERTICALLY OPPOSITE | VOLUME INCREASE BUTTON | VOLUME DECREASE BUTTON | HOME BUTTON |
| | RIGHT SIDE SURFACE IS TOP SIDE/FORWARD | POWER BUTTON | NONE | HOME BUTTON |
| B PHONE | LEFT SIDE SURFACE IS TOP SIDE/VERTICALLY OPPOSITE | VOLUME DECREASE BUTTON | VOLUME INCREASE BUTTON | BACK BUTTON |
| | RIGHT SIDE SURFACE IS TOP SIDE/FORWARD | POWER BUTTON | NONE | MENU BUTTON |
| C PHONE | LEFT SIDE SURFACE IS TOP SIDE/VERTICALLY OPPOSITE | VOLUME INCREASE BUTTON | VOLUME DECREASE BUTTON | MENU BUTTON |
| | RIGHT SIDE SURFACE IS TOP SIDE/FORWARD | NONE | NONE | NONE |

FIG. 8

| MODEL NAME | SHOOTING | OS VERSION |
|---|---|---|
| A PHONE | VOLUME INCREASE BUTTON VOLUME DECREASE BUTTON | 4.0~4.4 |
| | NONE | 2.3 |
| B PHONE | NONE | 2.3~4.4 |
| C PHONE | VOLUME INCREASE BUTTON VOLUME DECREASE BUTTON | 2.3~4.4 |

COMMUNICATION APPARATUS AND METHOD OF CONTROLLING SAME

BACKGROUND OF THE INVENTION

Field of the Invention

The present invention relates to a technique of controlling an image capturing device by a communication apparatus.

Description of the Related Art

Currently it is possible to wirelessly connect a digital camera with a mobile telephone or a smart phone (hereinafter, collectively a smart phone) and operate the smart phone to remotely control the digital camera as a remote camera. In addition, there is a digital camera for which, in a state in which the digital camera is attached to a smart phone, it is possible to perform shooting while displaying a live view image from the digital camera on a touch panel display of the smart phone (Japanese Patent Laid-Open No. 2006-339755).

If performing shooting while a digital camera is attached to a smart phone as described above, a user wirelessly connects the digital camera and the smart phone, and operates a screen of the smart phone by a finger or the like. In such a case, a user operates the touch panel of the smart phone by one hand while supporting the smart phone with the other hand, or operates the touch panel of the smart phone by a finger of either hand while supporting the smart phone with both hands. If shooting while operating the touch panel of the smart phone in this way, because the touch panel is being pressed by a finger it is easy for camera shake to occur, and in addition, it is not possible to perform shooting while operating the camera with a natural way of holding. In addition, when shooting while the digital camera is attached to the smart phone, it is desirable to be able to perform shooting by a physical operation member similarly to shooting with a conventional camera alone instead of performing shooting while operating the touch panel of the smart phone.

SUMMARY OF THE INVENTION

The present invention has been made in consideration of the aforementioned problems, and realizes a technique for, when shooting while an image capturing device is attached to a communication apparatus, achieving shooting by operating a physical operation member of the communication apparatus.

In order to solve the aforementioned problems, the present invention provides a communication apparatus comprising: an image capturing unit; a controller; a first communication interface configured to communicate with an image capturing device which is attachable to the communication apparatus; and a predetermined operation unit, wherein the controller, in a first state for performing image capturing by the image capturing unit, causes the predetermined operation unit to function as a member for instructing image capturing by the image capturing unit, and, in a second state for causing the image capturing device to perform image capturing via the first communication interface, causes the predetermined operation unit to function as a member for transmitting a capturing instruction via the first communication interface to the image capturing device.

In order to solve the aforementioned problems, the present invention provides a method of controlling a communication apparatus that includes an image capturing unit, a controller, a first communication interface for communicating with an image capturing device which is attachable to the communication apparatus, and a predetermined operation unit, the method comprising: causing, in a first state for performing image capturing by the image capturing unit, the predetermined operation unit to function as a member for instructing image capturing by the image capturing unit, and, causing, in a second state for causing the image capturing device to perform image capturing via the first communication interface, the predetermined operation unit to function as a member for transmitting a capturing instruction via the first communication interface to the image capturing device.

In order to solve the aforementioned problems, the present invention provides a non-transitory computer-readable storage medium storing a program for causing a computer to function as a controller of a communication apparatus that includes an image capturing unit, a first communication interface configured to communicate with an image capturing device which is attachable to the communication apparatus, and a predetermined operation unit, wherein the controller, in a first state for performing image capturing by the image capturing unit, causes the predetermined operation unit to function as a member for instructing image capturing by the image capturing unit, and, in a second state for causing the image capturing device to perform image capturing via the first communication interface, causes the predetermined operation unit to function as a member for transmitting a capturing instruction via the first communication interface to the image capturing device.

According to the present invention, when shooting while an image capturing device is attached to a communication apparatus, it is possible to perform the shooting while operating a physical operation member of the communication apparatus.

Further features of the present invention will become apparent from the following description of exemplary embodiments (with reference to the attached drawings).

BRIEF DESCRIPTION OF THE DRAWINGS

FIGS. 3A-3C are explanatory views for a case of shooting while a digital camera of the present embodiment is attached to a smart phone.

FIGS. 6A-6B are views for exemplifying a structure of function assignment data of the first embodiment.

FIG. 8 is a view for exemplifying function assignment data of a third embodiment.

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

[First Embodiment]

For the present embodiment, a smart phone that is a type of a mobile telephone as an example of a communication apparatus is explained by using a digital camera that can be attached to the smart phone as an example of an image capturing device. In the present embodiment, explanation is given of an example of a remote camera system in which the smart phone and the digital camera are communicably connected, and the remote camera system performs remote control of the digital camera. In addition, in the present embodiment, a smart phone as a communication apparatus is envisioned, but if a device that can attach to and can operate a digital camera, it can also be applied to a portable media player, a tablet terminal, a personal computer, or the like, for example.

<Configuration of Digital Camera 100>

Figure 1:
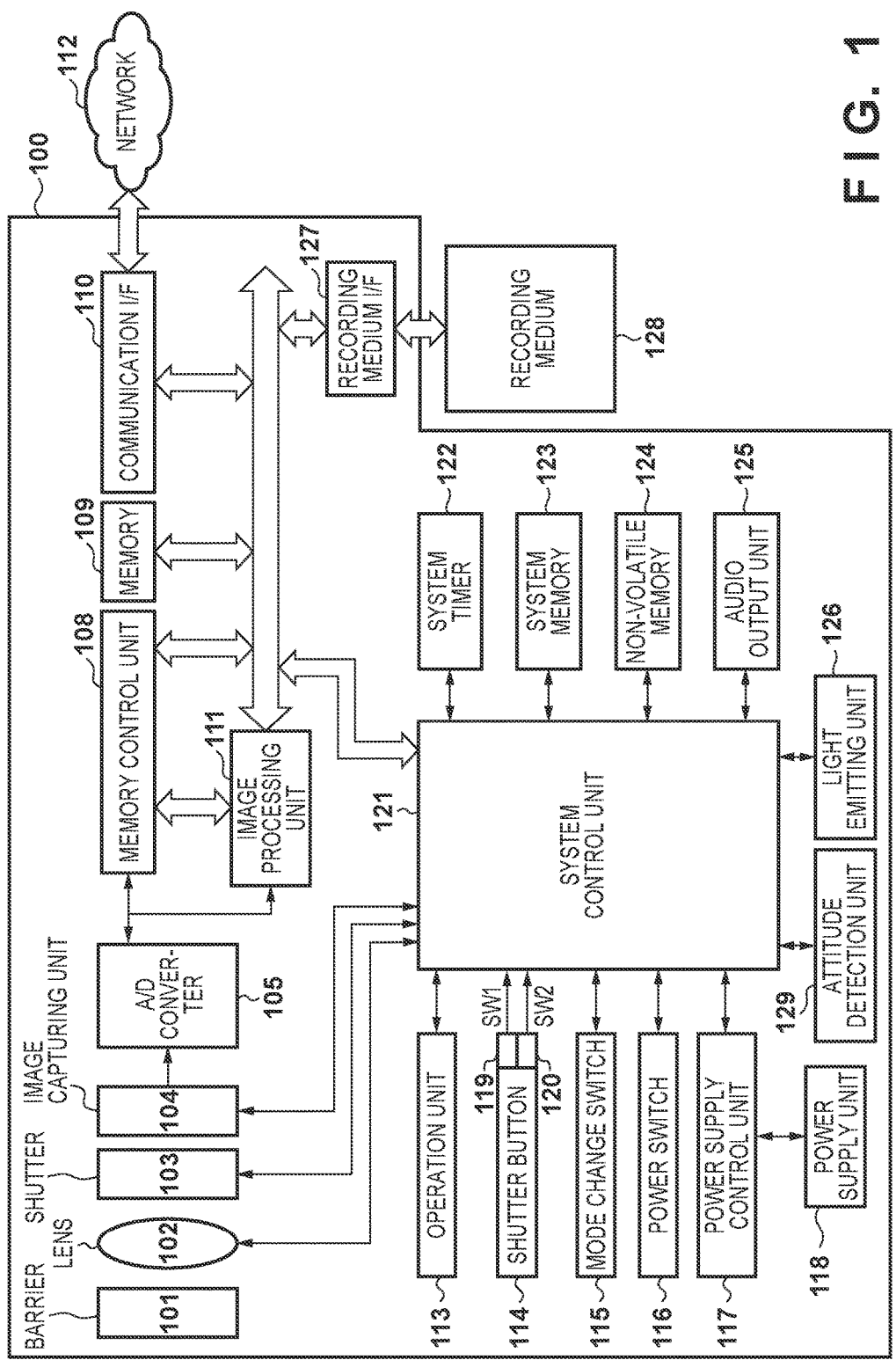
FIG. 1 is a block diagram that illustrates a configuration of a digital camera of the present embodiment.

With reference to FIG. 1, explanation is given regarding an overview of a configuration and functions of a digital camera 100 of an embodiment according to the present invention.

In FIG. 1, a photographing lens 102 is a lens group that includes a zoom lens and a focus lens. A shutter 103 is provided with an aperture function. An image capturing unit 104 is an image capturing element configured by a CMOS sensor, a CCD or the like for converting an optical image of an object into an electric signal. An A/D converter 105 converts an analog signal output from the image capturing unit 104 to a digital signal. By covering an image capturing system that includes the photographing lens 102 of the digital camera 100, a barrier 101 prevents dirtying or breakage of the image capturing system that includes the photographing lens 102, the shutter 103, and the image capturing unit 104.

An image processing unit 111 performs predetermined pixel interpolation, resize processing such as reduction, or color conversion processing on data from the A/D converter 105 or data from a memory control unit 108. In addition, in the image processing unit 111, predetermined calculation processing that uses captured image data is performed, and a system control unit 121 performs exposure control and focus control based on an obtained calculation result. By this, TTL (through the lens) type AF (auto focus) processing, AE (auto exposure) processing, and EF (pre-flashing) processing are performed. The image processing unit 111 further performs predetermined calculation processing that uses captured image data, and also performs TTL type AWB (auto white balance) processing based on an achieved calculation result.

Output data from the A/D converter 105 is directly written to a memory 109 via the memory control unit 108 or via the image processing unit 111 and the memory control unit 108. The memory 109 stores image data obtained by the image capturing unit 104 that has been converted to digital data by the A/D converter 105. The memory 109 is provided with sufficient storage capacity to store a predetermined number of still images or a predefined amount of time of moving images and audio.

A non-volatile memory 124 is a memory that can be electrically deleted/recorded to, and an EEPROM or the like is used, for example. Constants, programs and the like that are used in operation of the system control unit 121 are stored in the non-volatile memory 124. A program here means a program for executing various flowcharts described later in the present embodiment.

The system control unit 121 controls the digital camera 100 as a whole. By executing a previously described program recorded in the non-volatile memory 124, later described processing of the present embodiment is realized. For a system memory 123 a RAM is used. For example, a program read from the non-volatile memory 124, as well as variables and constants for operation of the system control unit 121 are loaded into the system memory 123.

A system timer 122 is a timer unit for measuring a time used in various control and a time of an integrated clock.

A mode change switch 115, a first shutter switch 119, a second shutter switch 120, and an operation unit 113 are operation units for inputting various operation instructions to the system control unit 121.

The mode change switch 115 switches an operation mode of the system control unit 121 to one of a still image shooting mode, a moving image recording mode, or the like. As modes included in the still image shooting mode, there are an auto mode, an auto scene mode, a manual mode, various scene modes that have shooting settings for each shooting scene, a program AE mode, a custom mode, or the like. By the mode change switch 115, one of the modes included in the still image shooting mode is directly switched to. Alternatively, configuration may be taken so that, after first switching to the still image shooting mode by the mode change switch 115, another operation member is used to switch to one of these modes that is included in the still image shooting mode. Similarly, a plurality of modes may be included in the moving image recording mode.

The first shutter switch 119 becomes on by a so-called half stroke (a capturing preparation instruction) part way through operation of the shutter button 114 provided in the digital camera 100, and generates a first shutter switch signal SW1. By the first shutter switch signal SW1, an operation such as AF processing, AE processing, AWB processing, and EF processing starts.

The second shutter switch 120 becomes on by completion of operation of the shutter button 114—a so-called full stroke (a capturing instruction), and generates a second shutter switch signal SW2. By the second shutter switch signal SW2, the system control unit 121 starts operation of a series of shooting processes from reading a signal from the image capturing unit 104 to writing image data to a recording medium 128.

A power switch 116 is an operation member for switching between power on and power off. A power supply control unit 117 is configured by a battery detection circuit, a DC-DC converter, a switch circuit for changing blocks to supply power to, and the like, and detects whether or not a battery is attached, a type of the battery, and a remaining capacity of the battery. In addition, based on a result of the detection and an instruction from the system control unit 121, the power supply control unit 117 controls the DC-DC converter to supply each unit including the recording medium 128 with a required voltage for a required period.

A power supply unit 118 is configured from a primary battery such as an alkaline battery or a lithium battery, a secondary battery such as an NiCd battery, an NiMH battery, or a lithium ion battery, or an AC adapter, or the like. A recording medium I/F 127 is an interface with the recording medium 128, which is a memory card, a hard disk, or the like. The recording medium 128 is a recording medium such as a memory card for recording a shot image, and is configured from a semiconductor memory, a magnetic disk, or the like.

A communication I/F 110 is an interface for performing transmission and reception of various data with respect to an external device connected to a network 112 such as the Internet. As an example, a wireless interface such as a wireless LAN, Bluetooth (registered trademark), or short distance wireless communication (Near Field Communication: NFC) are used. In addition, a wired interface such as USB may be used. The communication I/F 110 can transmit, via the network 112, an image captured by the image capturing unit 104 (including a live view image) or an image file recorded in the recording medium 128 to an external device, and can also receive various commands and other information from an external device. In the present embodiment, communication with a smart phone 200 is assumed to be performed via the communication I/F 110.

An audio output unit 125 is provided with a speaker, and generates audio such as a countdown sound for a self timer, a shutter sound that aligns with opening and closing of the shutter, other operation sounds, audio of a moving image at a time of a moving image reproduction, or the like.

A light emitting unit 126 is provided with an LED (light emitting diode) or the like. The light emitting unit 126 communicates an operating state of the digital camera 100 (for example, start/end of shooting, during countdown for the self timer, or the like) to an object by a predetermined emission/non-emission pattern, and is provided with a strobe function that flashes to illuminate the object. The light emitting unit 126 is arranged on a front surface (an object side, an image capturing surface side) of the camera so that it can be seen from an object side.

An attitude detection unit 129 detects an attitude of the digital camera 100 with respect to a gravitational direction. In accordance with an attitude detected by the attitude detection unit 129, it is possible to discriminate between whether an image captured by the image capturing unit 104 is something shot while the digital camera 100 is set up horizontally or shot while the digital camera 100 is set up vertically. The system control unit 121 can add information relating to the attitude detected by the attitude detection unit 129 to image data captured by the image capturing unit 104, or store the image data after rotating it. As the attitude detection unit 129, it is possible to use an acceleration sensor, a gyro sensor, a gravity sensor, a rotation vector sensor, or the like.

The digital camera 100 of the present embodiment has an attachment 150 (refer to FIG. 3) for attaching it to the smart phone 200. In a state where the digital camera 100 is attached to the smart phone 200, by operating a physical button of the smart phone 200, it is possible to execute a function for shooting by the digital camera 100 such as a shooting operation, a zoom operation, or a live view image display.

Note that configuration of hardware is not limited to that illustrated in FIG. 1, and for example one piece of hardware may perform communication control, shooting control, image processing control or the like, and function as each unit of the digital camera 100. In addition, a plurality of pieces of hardware may cooperate to function as one unit.

<Configuration of Smart Phone 200>

Figure 2:
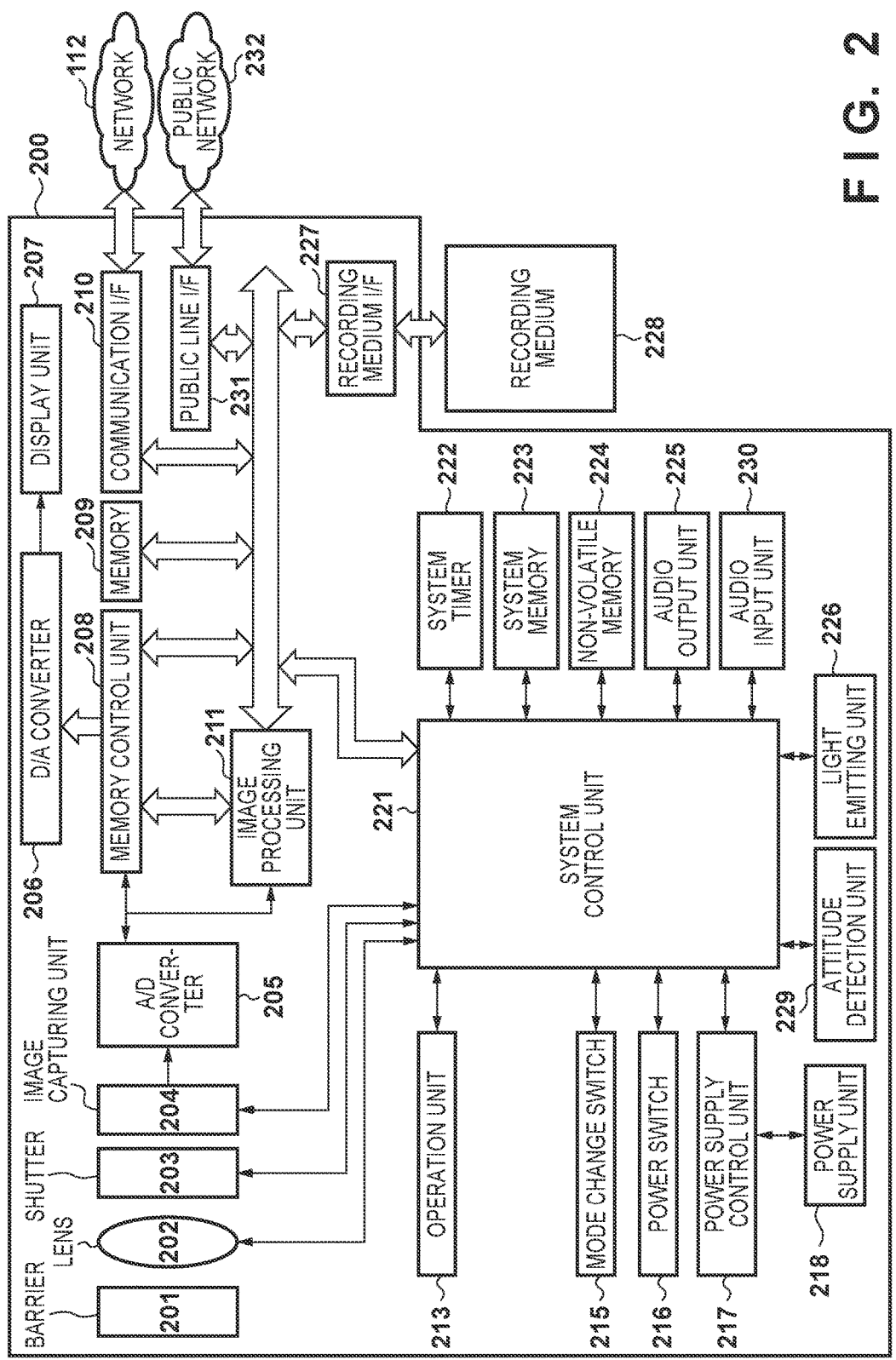
FIG. 2 is a block diagram that illustrates a configuration of a smart phone of the present embodiment.

Next, with reference to FIG. 2, explanation is given regarding an overview of a configuration and functions of a smart phone 200 of an embodiment according to the present invention.

The smart phone 200 of the present embodiment is provided with approximately the same configuration and functions as the digital camera 100 described above. Accordingly, in FIG. 2, configuration elements similar to those of the digital camera 100 have the first digit of their reference numeral set to 2 (i.e. numbered from 200 to 229), and explanation is given focusing on points different to the digital camera 100.

The smart phone 200 of the present embodiment is assumed to be able to execute various functions by installing applications. Out of applications for a smart phone, there are those that provide a function of achieving remote control of a commercial digital camera, and the present embodiment uses such an application. Detail is explained later.

The smart phone 200 of the present embodiment is provided with an audio input unit 230 such as a microphone, and it is possible to talk with a user of other communication device via an audio output unit 225 and the audio input unit 230.

A communication I/F 210 corresponds to the communication I/F 110 of FIG. 1, and performs communication with the digital camera 100. A public line I/F 231 enables calling by transmitting/receiving voice data via a public network 232 such as a telephone line.

In addition, the smart phone 200 incorporates a single camera module (hereinafter a local camera module) comprised from a barrier 201, a photographing lens 202, a shutter 203, and an image capturing unit 204, and is attached to a case surface of a side opposite to a display unit 207. The local camera module is mainly used by a user holding the smart phone 200 for shooting another object. Note that there is not necessarily only one of the above-described local camera module. In particular, a local camera module may further be attached to the same surface as the display unit 207. A local camera module attached to the case surface opposite to the display unit 207 is mainly used for shooting a landscape, other people, or the like. In contrast to this, the local camera module attached to the same surface as the display unit 207, in particular, is mainly used for shooting a user of the smart phone 200.

A memory 209 stores image data obtained by the image capturing unit 204 that has been converted to digital data by an A/D converter 205, or image data for displaying on the display unit 207. The memory 209 is provided with sufficient storage capacity to store a predetermined number of still images or a predefined amount of time of moving images and audio.

In addition, the memory 209 serves as a memory for image display (a video memory). A D/A converter 206 converts data for image display that is stored in the memory 209 into an analog signal and supplies it to the display unit 207. In this way image data for display that is written in the memory 209 is displayed by the display unit 207 via the D/A converter 206. The display unit 207 performs a display in accordance with the analog signal from the D/A converter 206 on a display device such as an LCD. By converting to analog in the D/A converter 206 a digital signal stored in the memory 209 that has first been A/D converted by the A/D converter 205 and consecutively transferring it to the display unit 207 to display it, it is possible to perform through the lens image display that functions as an electronic view finder. Note that the through-the lens image is a live view image in other words, and the through-the lens image display is a live view in other words.

A system control unit 221 performs display control by controlling the memory 209, the D/A converter 206, the display unit 207, and the like.

By a selection operation of various function icons displayed on the display unit 207, operation members of an operation unit 213 are appropriately assigned a function for each scene, and act as various function buttons. As function buttons, there is a terminate button, a back button, an image scrolling button, a jump button, a narrow-down button, an attribute modify button, or the like, for example. For example, when a menu button is pressed, a menu screen enabling various settings is displayed on the display unit 207. A user can use the menu screen displayed on the display unit 207 to intuitively perform various settings.

Constants, programs that are used in operation of the system control unit 221, a camera application, and the like are stored in a non-volatile memory 224. Note that a program for performing shooting by the local camera module is stored in the non-volatile memory 224, and it is presumed to be installed as an application (hereinafter a local camera application). The local camera application is typically pre-installed as an application standard to an OS of the smart phone 200, but configuration may be taken such that a user installs it after the fact. Furthermore, a program for communicating with the digital camera 100 is stored in the non-volatile memory 224, and it is presumed to be installed as an application (hereinafter a remote camera application). The remote camera application is typically created by a supply source of the digital camera 100 together with the digital camera 100, and is often distributed via the Internet or the like. Note that camera control by the smart phone 200 of the present embodiment is realized by reading a program provided by the remote camera application. Note that the remote camera application is assumed to have a program for using basic functions of an OS installed in the smart phone 200. Accordingly, for the camera control of the present embodiment, the OS of the smart phone 200 may be responsible for a portion of processing. Note that, in the present embodiment, explanation is given with the remote camera application being a separate application to the local camera application, but one application may have both functions. In addition, the OS of the smart phone 200 may itself have at least one function of the remote camera application and the local camera application.

The operation unit 213 includes a touch panel (touch screen) that can detect contact with respect to the display unit 207, and can configure a GUI so that a user can directly operate a screen displayed on the display unit 207. The system control unit 221 detects that a user has touched the touch panel, and executes processing in accordance with the touch position. Out of various types of touch panel, the touch panel may use any type, including a resistive-film type, a capacitance type, a surface acoustic wave type, an infrared ray type, an electromagnetic induction type, an image recognition type, or an optical sensor type.

The system control unit 221 can detect the following operations with respect to the touch panel. —Touching the touch panel by a finger or a pen (hereinafter a touch down). —A state in which the touch panel is being touched by a finger or pen (hereinafter a touch-on). —Movement while the touch panel is being touched by a finger or a pen (hereinafter a slide). —Releasing a finger or a pen that has been touching the touch panel (hereinafter a touch-up). —A state in which the touch panel is not being touched by anything (hereinafter touch-off). These operations and position coordinates at which a finger or a pen is touching the touch panel are notified to the system control unit 221, and the system control unit 221 determines what kind of operation has been performed on the touch panel based on the notified information. When a touch-up is performed within a predefined amount of time from a touch down without performing a slide, it is assumed that a tap has been performed. A tap is an operation that touches the touch panel for only a moment, and is often used as an operation similar to a click by a mouse, such as for designating an item or pressing a button. When a touch-up is performed after performing a slide of some extent from a touch down on the touch panel, it is assumed that a stroke has been drawn. An operation of quickly drawing a stroke is called a flick. A flick is an operation in which a finger that stays in contact with the touch panel is quickly moved by only a certain distance and is released as is, and if reworded is an operation for quickly tracing so as to flick a finger over the touch panel. It is possible to determine that a flick has been performed if sliding for a predetermined distance or more at a predetermined speed or more is detected and a touch-up without change is detected. In addition, if sliding for the predetermined distance or more but less than the predetermined speed is detected, it is assumed that a drag has been performed is determined.

<Explanation of Use Case>

Next, with reference to FIG. 3, explanation is given of a case in which the digital camera 100 of the present embodiment is attached to the smart phone 200 to perform shooting.

In the present embodiment, as illustrated in FIG. 3A, a case in which a user performs shooting while the digital camera 100 is attached to the smart phone 200 is envisioned. The smart phone 200 controls so as to cause the image capturing unit 104 of the digital camera to operate, and displays a live view image on the display unit 207. In this way, by shooting while the smart phone 200 is attached to the digital camera 100, regardless of that remote shooting is actually being performed, a user can perform shooting with the same feeling as shooting by a camera integrated in the smart phone 200.

In a state in which the digital camera 100 is attached to the smart phone 200 as in FIG. 3A, the digital camera 100 and the smart phone 200 configure a system wirelessly connected via the communication I/F 110 and the communication I/F 210. The smart phone 200 performs communication with the digital camera 100 as an external device via the communication I/F 110 and the communication I/F 210, and controls so as to cause the image capturing unit 104 of the digital camera 100 to operate.

In FIG. 3 a live view image captured by the digital camera 100 is displayed in the display unit 207 of the smart phone 200. By operating physical buttons 400-405 of the smart phone 200 that are described later with reference to FIG. 4, a user transmits a command for causing execution of a function for shooting to the digital camera 100. Note that, in the present embodiment, to the extent that no mention is given in particular, the digital camera 100 is explained as a kind of a remote camera that can be wirelessly connected to and controlled remotely. In a use case of using a remote camera while it is attached to the smart phone 200, a user can perform shooting with a feeling as if they were using a high-function integrated camera. In a use case of using a high-function external camera in place of the camera integrated in the smart phone 200, it can be said that a remote camera that can be attached to the smart phone 200 will often be used.

FIGS. 3B-3C exemplify states in which a user is performing shooting in a state where the digital camera 100 is attached to the smart phone 200 as in FIG. 3A. In the present embodiment, in a state where the digital camera 100 is attached to the smart phone 200, it is possible to change a function assigned before the attachment to an operation member such as a button or switch of the smart phone 200 that physically shifts (hereinafter referred to as a physical button) to a function for shooting by the digital camera 100. In FIG. 3B, a user can perform an operation for executing a function for shooting by a physical button of the smart phone 200 to which the digital camera 100 is attached, and can perform shooting while operating the camera with a more natural way of holding.

As a method for detecting that the digital camera 100 is attached to the smart phone 200, there are the following methods, for example.

(1) Determining an attached state by using short distance wireless communication (NFC) to detect contact between the smart phone 200 and the digital camera 100.

(2) Determining an attached state by calculating a distance between the smart phone 200 and the digital camera 100 from a communication state such as a received signal strength of wireless communication such as Bluetooth (registered trademark) or a wireless LAN, and determining that they are closer than a threshold.

(3) Analyzing an image of the integrated camera and determining an attached state when the image of the integrated camera is cut off by the integrated camera being blocked by attachment of the digital camera 100, when the image of the integrated camera is cut off by the integrated camera being blocked by a hand in accordance with a user using the case of the smart phone 200 to which the digital camera 100 is attached as a grip, or when the digital camera 100 is shown in the image of the integrated camera upon attaching the digital camera 100.

(4) Determining an attached state when it is determined that the same object has been taken after analyzing an image of the integrated camera and an image of the digital camera 100.

(5) Providing on the attachment 150 of the digital camera 100 a physical switch for detecting attachment of the smart phone 200, and determining an attached state when the switch is turned on.

An attachment determination device such as above is provided, and a function assigned to an operation member of the smart phone 200 is changed to a function for shooting by the digital camera 100 by a camera application. In this way, a user can perform shooting by operating the camera with a more natural way of holding.

Note that, when performing shooting while operating the camera with a natural way of holding, in a situation in which a user has set up the smart phone 200 as in FIG. 3B, there may be a case in which a thumb or the like touches the touch panel of the smart phone 200 and an involuntary operation is performed. Accordingly, a setting for disabling a touch operation to the touch panel may be provided in the remote camera application.

<Configuration of Outer Appearance of Smart Phone 200>

Figure 4:
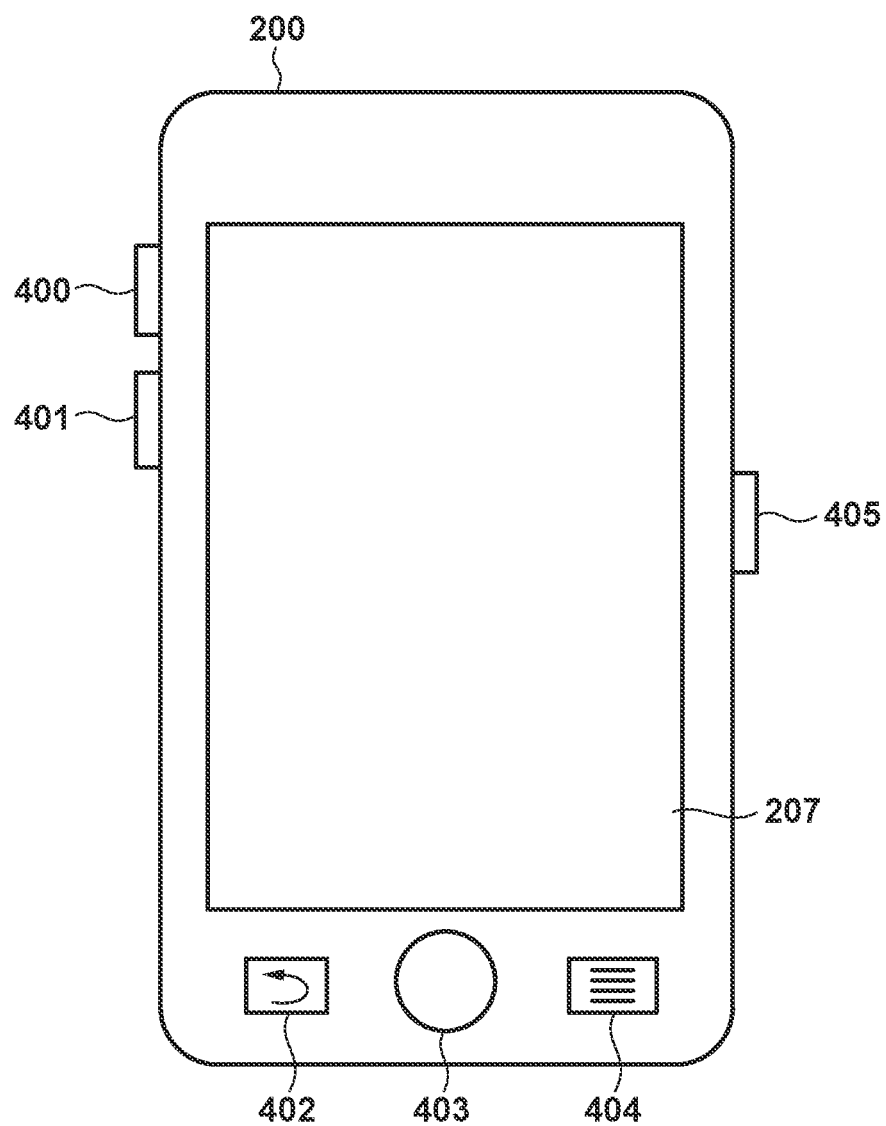
FIG. 4 is a perspective view of a smart phone of the present embodiment.

Next, with reference to FIG. 4, explanation is given of a configuration of an outer appearance that includes a physical button as a push button type operation member that physically shifts and is provided on the smart phone 200.

On a side part of a left side on the casing of the smart phone 200, volume buttons that include a volume increase button 400 and a volume decrease button 401 for adjusting sound volume of audio or an alarm are arranged. In addition, on a bottom part of the display unit 207 of a front surface portion of the casing of the smart phone 200, a back button 402 used to cancel a function or a screen transition, a home button 403 for transitioning to a home screen of an operating system (OS) that operates on the smart phone 200, and a menu button 404 for performing display of a menu screen are arranged. In addition, on a side part of a right side of the casing of the smart phone 200, a power button 405 is arranged.

<Function Assignment Processing>

Next, with reference to FIG. 5, explanation is given of processing for assigning a function for shooting of the digital camera 100 to a physical button of the smart phone 200, in a state where the digital camera 100 is attached to the smart phone 200.

Note that the process of FIG. 5 is realized by reading a program stored in the non-volatile memory 224 of the smart phone 200 into a system memory 223, and being executed by the system control unit 221. It is similar for FIG. 7 which is described later.

Figure 5B:
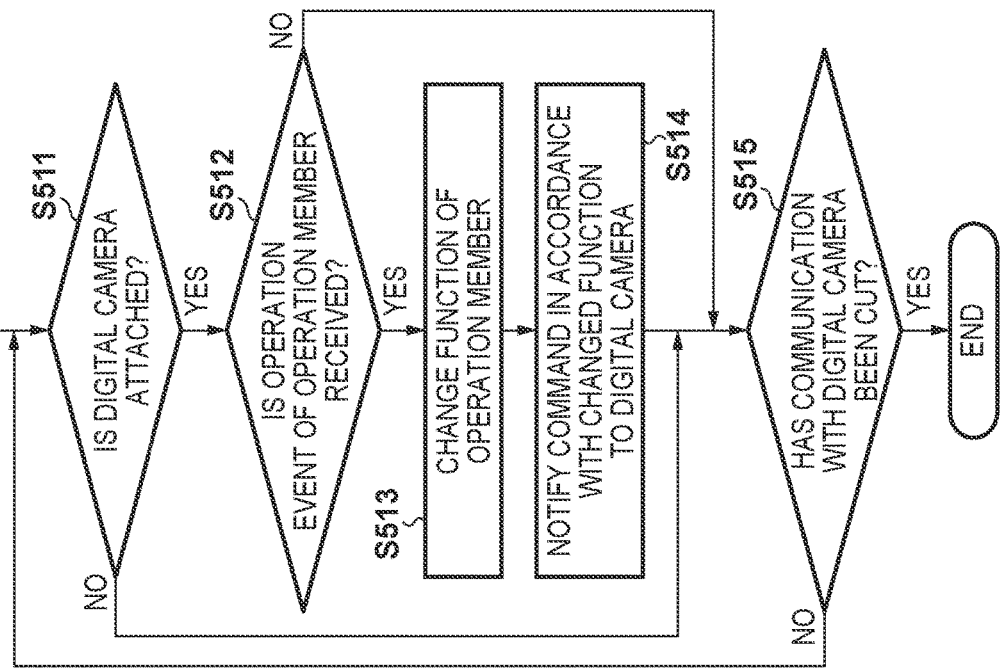
FIGS. 5A-5B are flowcharts for illustrating function assignment processing of a first embodiment.
Figure 5A:
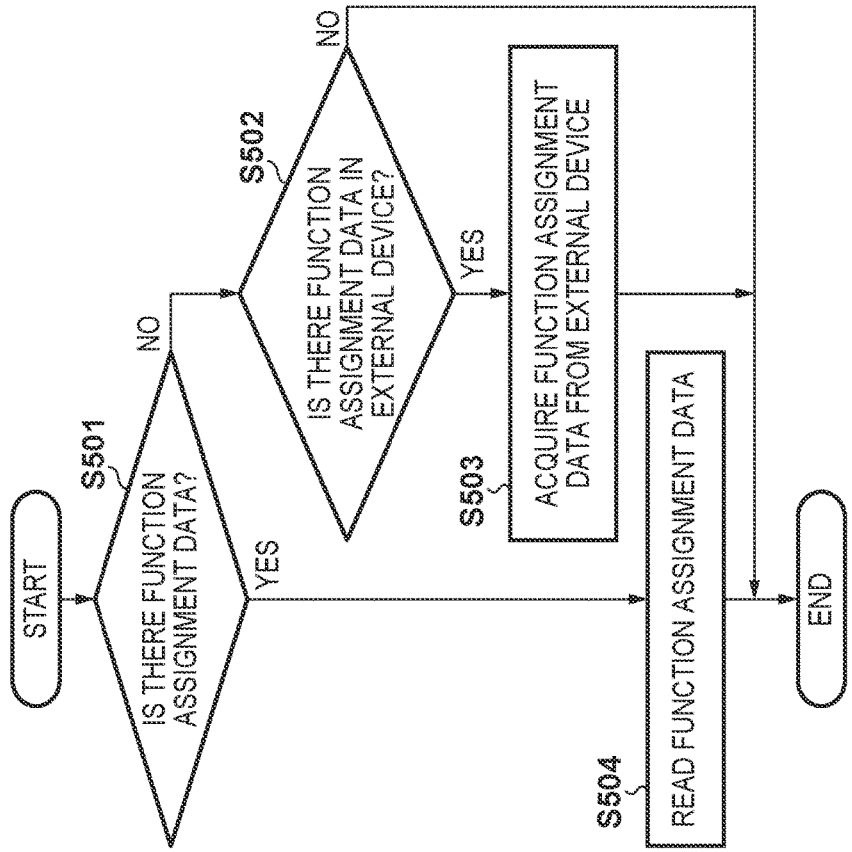

In addition, the process of FIG. 5A is activated by the remote camera application of the smart phone 200, and is started when a wireless connection between the smart phone 200 and the digital camera 100 is established. A wireless connection between the digital camera 100 and the smart phone 200 in the present embodiment is assumed to use a wireless LAN, and as an example explanation is given of a wireless LAN in which the digital camera 100 operates as a simple access point. Note that, as a connection configuration other than a simple access point, a form of connecting by using a wireless LAN router or a form of connecting by using Bluetooth (registered trademark) may be used.

In step S501, the system control unit 221 determines whether function assignment data for physical buttons of the smart phone 200 as illustrated in FIG. 6A is stored in the non-volatile memory 224 or a recording medium 228. If a result of the determination is that this is not stored in the smart phone 200 the process proceeds to step S502, and if this is already stored the process proceeds to step S504. Note that function assignment data is presumed to be stored in the non-volatile memory 224 or the recording medium 228 in a file format, and the system control unit 221 detects the presence or absence of a function assignment data file in the non-volatile memory 224 or the recording medium 228.

Here, with reference to FIG. 6A, explanation is given of a configuration of physical button function assignment data that the remote camera application of the smart phone 200 of the present embodiment refers to.

Function assignment data has a data structure in which, for each model of the smart phone 200, an operation event notified from an OS when a physical button is operated, and a function event and command that control operation for shooting of the digital camera 100 are associated. This function assignment data is assumed to be saved as a file in the non-volatile memory 224 or the recording medium 228 at a time of installation of the remote camera application. As another embodiment, configuration may be taken such that the OS of the smart phone 200 manages the function assignment data.

Returning to FIG. 5A, in step S502, the system control unit 221 determines whether function assignment data is present in an external device connected via the communication I/F 210, a server than can be accessed via the network 112, or the like. If function assignment data is present externally, the process proceeds to step S503, and if not present the process terminates.

In step S503, the system control unit 221 acquires function assignment data from the network 112 or an external device via the communication I/F 210.

In step S504, the system control unit 221 reads the function assignment data from the non-volatile memory 224 or the recording medium 228, and loads it into the system memory 223 which the remote camera application can refer to.

Next, with reference to FIG. 5B, explanation is given of processing for assigning, in accordance with the function assignment data, a function for shooting by the digital camera 100 to a physical button of the smart phone 200.

Note that, the process of FIG. 5B is started from a state in which the function assignment data has been read in step S504 of FIG. 5A.

In step S511, the system control unit 221 determines whether the digital camera 100 is attached to the smart phone 200 as explained by FIG. 3, and if attached the process proceeds to step S512, and if not attached the process proceeds to step S515.

In step S512, the system control unit 221, by the physical button of the smart phone 200 being operated, determines whether the remote camera application received an operation event for the physical button from the OS. If the result of the determination is that an operation event was received the process proceeds to step S513, and if not received the process proceeds to step S515.

In step S513, the system control unit 221, based on the function assignment data and the operation event for the physical button, changes the function assigned to the physical button to a function for shooting of the digital camera 100 in accordance with the function assignment data illustrated in FIG. 6A. Note that, in step S513, the system control unit 221 performs processing as a disabled operation by not returning an operation event for the physical button of the smart phone 200 to the OS.

In step S514, the system control unit 221 notifies the digital camera 100 of a function event and command for controlling an operation for shooting that is newly assigned to the physical button by the remote camera application which is operated by the smart phone 200.

In step S515, the system control unit 221 determines whether communication with the digital camera 100 that is attached to the smart phone 200 has been cut, and if communication continues the process returns to step S511, and if communication has been cut the process terminates.

In the present embodiment, explanation is given of an example in which assignment of functions of physical buttons of the smart phone 200 is changed based on the function assignment data illustrated in FIG. 6A. As another example, a function such that a user can set assignment of functions by a manual operation may be provided in the remote camera application.

In the example illustrated in FIG. 6A, for the function assignment data, in a case in which the smart phone 200 is an "A phone" model, if a user operates the volume increase button 400 an operation event for the volume increase button 400 is notified to the remote camera application from the OS. The remote camera application refers to the function assignment data illustrated in FIG. 6A, converts it to a function event and command that corresponds to an operation event received from the OS, and notifies it to the digital camera 100. Note that, in FIG. 6A, as a function for shooting of the digital camera 100, a shooting operation, a zoom operation, image confirmation, or the like are exemplified, but limitation is not made to this, and for example it may be an auto focus operation, a framing decision, start/end of a moving image recording, or another function.

[Second Embodiment]

Explanation regarding a second embodiment is given below.

The present embodiment, is something that focuses on a problem in which, in a case where the smart phone 200 to which the digital camera 100 is attached at a time of shooting is set up to face an object, if a position of a physical button is changed to be vertically opposite according to the user's holding hand, it becomes impossible to perform shooting by operating the camera with a natural way of holding. To solve such a problem, in the present embodiment, assignment of the functions of physical buttons according to a user's holding hand is changed based on information relating to an attitude of the smart phone 200 and function assignment data.

<Function Assignment Processing>

Figure 7:
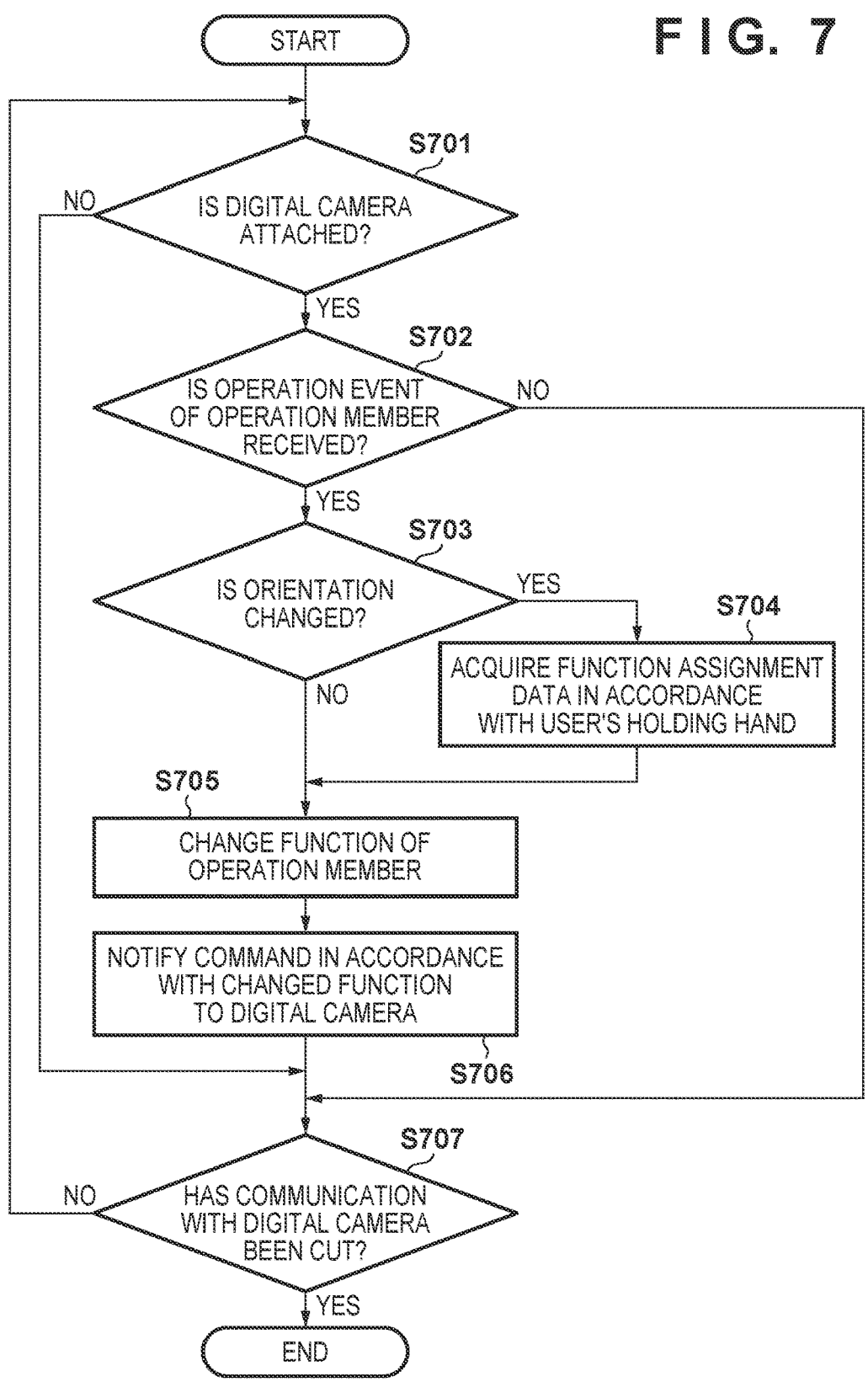
FIG. 7 is a flowchart for illustrating function assignment processing of a second embodiment.

FIG. 7 illustrates physical button function assignment processing by the smart phone 200 of the second embodiment.

Note that, because the process of step S701, step S702, and step S705 to step S707 of FIG. 7 are similar to step S511 to step S515 of FIG. 5B, explanation thereof is omitted, and explanation is given mainly of points of difference.

In step S703, the system control unit 221 determines whether the attitude of the smart phone 200 has changed from information relating to the attitude of the smart phone 200 detected by an attitude detection unit 229. If the result of the determination is that the attitude has changed the process proceeds to step S704, and if not changed the process proceeds to step S705.

In step S704, the system control unit 221 confirms whether function assignment data in accordance with a user's holding hand illustrated in FIG. 6B is present. If data is present, the function assignment data is read from the non-volatile memory 224 or the recording medium 228, and loaded into the system memory 223 which the remote camera application can refer to. In addition, if function assignment data in accordance with a user's holding hand illustrated in FIG. 6B is not present, function assignment data from, for example, a server connected to the network 112 of an external device via the communication I/F 210 is acquired. Subsequently, process of step S705 onward is executed.

<Function Assignment Data>

FIG. 6B is something that adds, to the function assignment data of FIG. 6A, functions assigned in accordance with differences in the user's holding hand (attitude of the smart phone), for each model of the smart phone 200. For the user's holding hand, there are the following four states, for example.

If a user sets up the left side surface of the smart phone 200 to be a top side (a state in which volume increase/decrease buttons 400 and 401 on the smart phone 200 are positioned upward, as in FIG. 3B).

If a user sets up the right side surface of the smart phone 200 to be a top side (a state in which the power button 405 on the smart phone 200 is positioned upward, as in FIG. 3C).

A state in which the smart phone 200 is set up forward (in other words, a state in which buttons 402-404 on the smart phone 200 of FIG. 4 are positioned in a lower portion).

A state in which the smart phone 200 is set up forward and vertically opposite (in other words, a state in which buttons 402-404 on the smart phone 200 of FIG. 4 are positioned in an upper portion).

The system control unit 221 determines the state of the user's holding hand from information relating to the attitude of the smart phone 200 acquired by the attitude detection unit 229. Based on the state of a user's holding hand, the remote camera application refers to the function assignment data illustrated in FIG. 6B, and changes a function assigned to a physical button to a function for shooting by the digital camera 100 in accordance with the function assignment data of FIG. 6B. The remote camera application makes a conversion to a command that supports the function newly assigned to the physical button, and notifies the digital camera 100 attached to the smart phone 200.

[Third Embodiment]

Explanation regarding a third embodiment is given below.

In the use cases explained by the first and second embodiments above, the function of the physical button of the smart phone 200 was changed to a function for shooting by the digital camera 100. In each of the embodiments above, a function considered to be optimal is assigned to a physical button when a user performs shooting while having set up the smart phone 200 in advance. However, if a user performs shooting while using the integrated camera of the smart phone 200 (if using the standard local camera application of the OS), there are cases in which a way of shooting by operating the physical button by a similar operation method enables shooting without a sense of unnaturalness.

Accordingly, in the present embodiment, if shooting is performed by operating the smart phone 200 to which the digital camera 100 is attached, when shooting by using the local camera module of the smart phone 200, a similar function is assigned to the physical button.

<Function Assignment Processing>

In the present embodiment, when reading the function assignment data in step S504 of FIG. 5A, if there is a setting in the local camera application in accordance with function assignment of a physical button of the smart phone 200, the function assignment data illustrated in FIG. 8 is read. In addition, in step S513 of FIG. 5B, by determining the version of the OS of the smart phone 200, it becomes possible to provide a user with a function for shooting similarly to the local camera application.

<Function Assignment Data>

FIG. 8 is a data configuration similar to the assignment of functions to physical buttons of a local camera application for controlling the integrated camera of the smart phone 200, for each model of the smart phone 200. In the function assignment data illustrated in FIG. 8, to be able to support a case in which assignment of a function of a physical button is changed depending on an OS version, a configuration is taken in which differences in OS versions are also reflected in the function assignment data.

The system control unit 221 determines a version of the OS. Based on the version of the OS, the remote camera application refers to the function assignment data illustrated in FIG. 8, converts it to a command corresponding to a function assigned to a physical button, and notifies it to the digital camera 100 attached to the smart phone 200.

Note that, in the present embodiment, a method that does not use the function assignment data as in FIG. 8 is considered. For example, there are many cases in which the OS or local camera application of the smart phone 200 holds function assignment information regarding which function of the local camera application is assigned to a physical button. Accordingly, the remote camera application may acquire information relating to function assignment from the OS or the local camera application of the smart phone 200, and use it as function assignment data. If using this method, the remote camera application does not determine a model and an OS version, and function assignment in alignment with a smart phone currently being used is possible.

By each of the above embodiments, because it is possible to perform shooting by operating a physical button of a smart phone when shooting while the digital camera 100 is attached to the smart phone 200, a user can perform shooting while operating the camera with a more natural way of holding.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-214803, filed Oct. 30, 2015 which is hereby incorporated by reference herein in its entirety.

What is claimed is:

1. A communication apparatus comprising:
   an image capturing unit;
   a controller;
   a first communication interface configured to communicate with an image capturing device which is attachable to the communication apparatus by using an attachment member; and
   a predetermined operation unit,
   wherein the controller,
      in a first state in which the image capturing device is not attached to the communication apparatus, causes the predetermined operation unit to function as a member for instructing image capturing by the image capturing unit,
      and, in a second state in which the image capturing device is attached to the communication apparatus, causes the predetermined operation unit to function as a member for transmitting a capturing instruction via the first communication interface to the image capturing device which is attached to the communication apparatus.

2. The apparatus according to claim 1, where the second state is a state in which communication is established with the image capturing device via the first communication interface.

3. The apparatus according to claim 1, wherein the controller determines whether the image capturing device is in a state of being attached to the communication apparatus, based on a communication state via the first communication interface.

4. The apparatus according to claim 1, further comprising a second communication interface different from the first communication interface that wirelessly communicates with the image capturing device,
wherein the controller determines whether the image capturing device is in a state of being attached to the communication apparatus, based on a communication state via the second communication interface.

5. The apparatus according to claim 1, wherein the controller determines whether the image capturing device is in a state of being attached to the communication apparatus, based on a state of a physical switch.

6. The apparatus according to claim 1, wherein the predetermined operation unit includes a button for adjusting sound volume.

7. The apparatus according to claim 1, wherein the predetermined operation unit includes a button for transitioning to a home screen.

8. The apparatus according to claim 1, further comprising a memory for storing function assignment data that associates at least one operation unit of the communication apparatus with a function for shooting by the image capturing unit,
wherein the controller, based on the function assignment data, causes an operation unit to function as a member for transmitting a capturing instruction to the image capturing device via the first communication interface.

9. The apparatus according to claim 8, wherein the controller, if the function assignment data is not present in the memory, acquires the function assignment data from another apparatus via the first communication interface.

10. The apparatus according to claim 8, wherein the function assignment data includes, for each model of the communication apparatus, an association between a function of the operation unit and a function for shooting by the image capturing unit.

11. The apparatus according to claim 8, further comprising an attitude detection unit configured to acquire information relating to an attitude of the communication apparatus,
wherein the function assignment data includes an association between an attitude of the communication apparatus, a function of the operation unit, and a function for shooting by the image capturing unit.

12. The apparatus according to claim 1, wherein, in the second state, the controller does not cause the predetermined operation unit to function as a member for instructing image capturing by the image capturing unit.

13. A method of controlling a communication apparatus that includes an image capturing unit, a controller, a first communication interface for communicating with an image capturing device which is attachable to the communication apparatus by using an attachment member, and a predetermined operation unit, the method comprising:
causing, in a first state in which the image capturing device is not attached to the communication apparatus, the predetermined operation unit to function as a member for instructing image capturing by the image capturing unit; and
causing, in a second state in which the image capturing device is attached to the communication apparatus, the predetermined operation unit to function as a member for transmitting a capturing instruction via the first communication interface to the image capturing device which is attached to the communication apparatus.

14. A non-transitory computer-readable storage medium storing a program for causing a computer to function as a controller of a communication apparatus that includes an image capturing unit, a first communication interface configured to communicate with an image capturing device which is attachable to the communication apparatus by using an attachment member, and a predetermined operation unit,
wherein the controller,
in a first state in which the image capturing device is not attached to the communication apparatus, causes the predetermined operation unit to function as a member for instructing image capturing by the image capturing unit, and
in a second state in which the image capturing device is attached to the communication apparatus, causes the predetermined operation unit to function as a member for transmitting a capturing instruction via the first communication interface to the image capturing device.

* * * * *